US 6,646,595 B1

(12) United States Patent
Heng et al.

(10) Patent No.: US 6,646,595 B1
(45) Date of Patent: Nov. 11, 2003

(54) SCALABLE, RECONFIGURABLE GPS RECEIVER

(75) Inventors: Mark A. Heng, Scottsdale, AZ (US); Russell D. Thomas, Chandler, AZ (US); Maya Tampi, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 10/216,011

(22) Filed: Aug. 9, 2002

(51) Int. Cl.[7] .................... G01S 5/02; H04B 7/185
(52) U.S. Cl. .................. 342/357.06; 342/357.12; 701/213
(58) Field of Search .............. 342/357.12, 357.06; 701/213

(56) References Cited

U.S. PATENT DOCUMENTS

| 5,148,452 | A | | 9/1992 | Kennedy et al. |
|---|---|---|---|---|
| 5,920,283 | A | | 7/1999 | Shaheen et al. |
| 6,078,290 | A | | 6/2000 | McBurney et al. |
| 6,198,930 | B1 | | 3/2001 | Schipper |
| 6,603,428 | B2 | * | 8/2003 | Stilp .................. 342/457 |
| 2001/0017598 | A1 | | 8/2001 | Townsend et al. |

FOREIGN PATENT DOCUMENTS

| EP | 1213659 A2 | 6/2002 |
|---|---|---|
| WO | WO 01/63317 A1 | 8/2001 |

* cited by examiner

Primary Examiner—Theodore M. Blum
(74) Attorney, Agent, or Firm—Thomas V. Miller

(57) ABSTRACT

A GPS receiver (26) for processing GPS satellite signals and adapted for connection to a client device (24). The receiver (26) includes a down converter (44), a correlator (46), and a microcomputer A. The microcomputer A has a microprocessor A, a first memory (48A), a second memory (48B, 148B), and an input/output interface (50). The input/output interface (50) is capable of being connected to the client device (24). The first memory (48A) contains a first set of instructions for the microprocessor A to download and store in the second memory (48B, 148B) at least one time critical GPS software module ($A_1, A_2, \ldots A_N$) from the client device (24). The first memory (48A) also contains a second set of instructions for the microprocessor A to determine whether to download and store in the second memory (48B, 148B) a plurality of non-time critical software modules ($B_1, B_2, \ldots B_N$) from the client device (24).

20 Claims, 5 Drawing Sheets

SCALABLE, RECONFIGURABLE GPS RECEIVER

FIELD OF THE INVENTION

This invention in general relates to global positioning system (GPS) receivers and, more particularly, to a system and method for a scalable and reconfigurable GPS receiver for a client device.

BACKGROUND OF THE INVENTION

The global positioning system (GPS) is a constellation of satellites that transmits navigation information via radio signals. Receivers that are able to receive and process these radio signals may calculate position and time. The satellites of the GPS constellation broadcast two BPSK modulated signals at L-band, 1575.42 megahertz (L1) and 1227.6 megahertz (L2). The modulated signals include pseudorandom noise codes and data. The L1 signal carrier is modulated in quadrature with both a clear acquisition code (CA code) and a precise code (P code).

Conventional GPS receivers need to track at least four satellites of the GPS constellation in order to compute a GPS receiver's position and time. An almanac is stored in the GPS receiver to help identify visible satellites and to track satellite orbits. Locally generated pseudorandom noise codes are generated within the GPS receiver and compared to the received satellite signals. From the compared signals, the GPS receiver generates measurement data that reflects travel times of the received satellite signals. Knowing the travel times of the satellite signals allows the GPS receiver to compute distances between each satellite and the GPS receiver. The GPS receiver may then compute a position solution.

In the past, GPS receivers have a dedicated microcomputer with GPS specific hardware components and software components. The microcomputer typically includes a microprocessor, memory and other peripherals such as a universal asynchronous receiver/transmitter (UART) on a single chip. GPS specific hardware typically down converts and de-spreads the GPS satellite signals. The software components are typically dedicated to GPS functionality such as tracking satellites, generating measurement data, and computing a position solution. Other software functions may include satellite visibility alerts and computing satellite orbits.

On the commercial side, GPS receivers may be made and sold as modules by a GPS manufacturer and integrated into an OEM client device (such as a phone or personal digital assistant (PDA)). A need exists for relocate-able software functions for GPS receiver modules that are designed for being installed into client devices. In particular, the software in a GPS receiver used in one client device may need to be configured differently from another type of client device. A GPS receiver (sold as a module) whose architecture and design is flexible for different types of client devices (and different OEMs) would result in a lower cost because smaller memory sizes may be used within the GPS receiver. A smaller memory size may be used because the customer may specifically configure the number and type of software functions that are best suited for storage in the GPS receiver and those best suited for storage in the client device. Existing GPS receivers do not provide this flexibility and hence low-cost features.

Accordingly, there is a need to provide a GPS receiver that is flexible for different types of client devices. This lowers the cost of the GPS receiver because smaller memory sizes may be used within the GPS receiver. It is, therefore, desirable to provide a GPS receiver system and method to overcome or minimize most, if not all, of the preceding problems.

Figure 1:
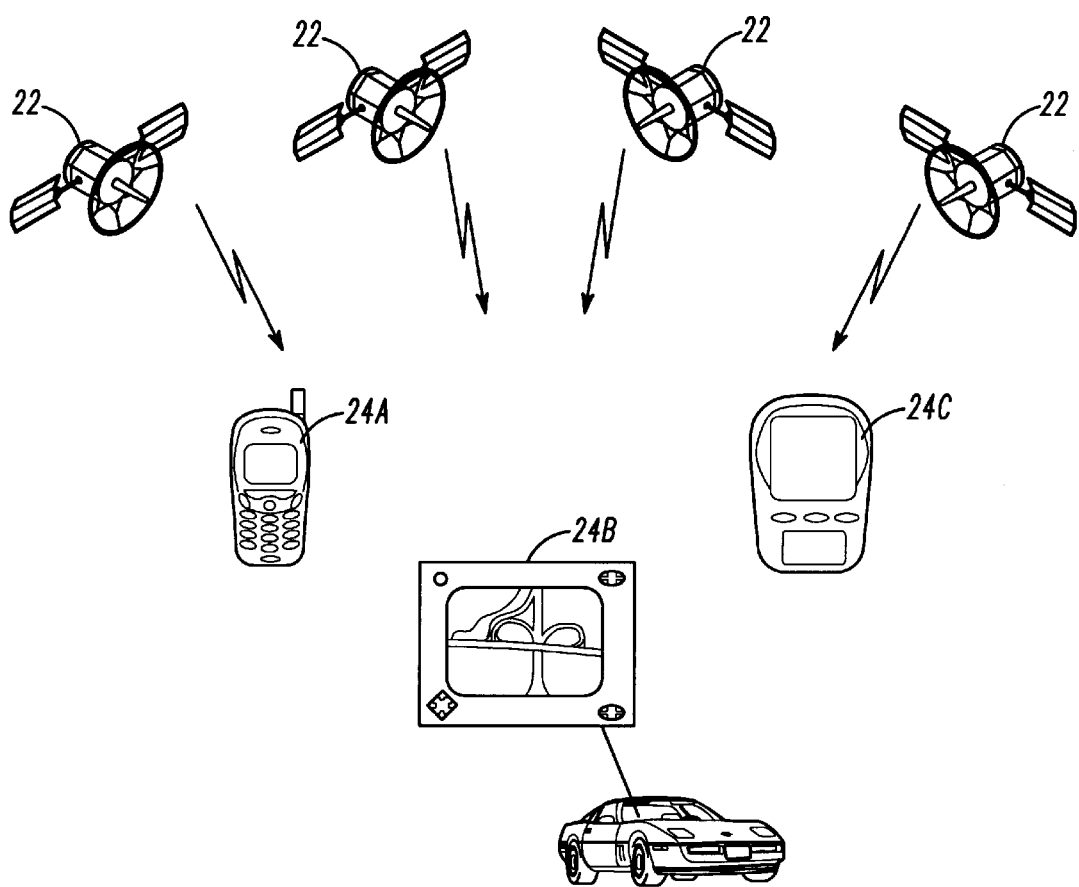
FIG. 1 is a system level diagram of client devices with GPS receivers receiving signals from GPS satellites.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DETAILED DESCRIPTION

What is described is a system and method for a GPS receiver for a client device that is capable of being scalable and reconfigurable. The system and method provides an OEM or other client the flexibility of scaling and reconfiguring the GPS receiver for the specific uses of the client device.

To this end, in one embodiment there is a receiver for processing satellite signals (such as GPS signals) and adapted for connection to a client device. The receiver includes a down converter, a correlator, and a microcomputer. The microcomputer has a microprocessor, a first memory, a second memory, and an input/output interface. The input/output interface is capable of being connected to the client device. The first memory contains a first set of instructions for the microprocessor to download and store in the second memory at least one time critical GPS software module from the client device. These instructions may indicate that all time critical GPS software modules be downloaded. Alternatively, these instructions may include a determination step to select which of a plurality of time critical GPS software modules should be downloaded. The first memory also contains a second set of instructions for the microprocessor to determine whether to download and store in the second memory a plurality of non-time critical software modules from the client device.

In one embodiment, the receiver further has memory for storing static and/or dynamic configuration data that is accessible to the first set of instructions and the second set of instructions. The configuration data may be inputted or modified by a manufacturer or other down line operator of the client device. The configuration data may include an identification of the type of time critical GPS software modules that are to be downloaded from the client device to the second memory. The configuration data may further include an identification of the type of non-time critical GPS software modules (if any) that are to be downloaded from the client device to the second memory.

In a further embodiment, there is an apparatus that includes a GPS receiver and a client device. The GPS receiver has a first microprocessor, a first memory, a second memory, and an input/output interface. The client device has a second microprocessor, a third memory, and an input/output interface. The input/output interface of the client device is connected to the input/output interface of the GPS receiver via a communication link. The first memory of the GPS receiver contains a first set of instructions for the first microprocessor to download at least one time critical GPS software module from the third memory in the client device and to store in the second memory of the GPS receiver. These instructions may indicate that all time critical GPS software modules be downloaded. Alternatively, these instructions may include a determination step to select which of a plurality of time critical GPS software modules should be downloaded. The first memory of GPS receiver further contains a second set of instructions for the microprocessor to determine whether to download each of a plurality of non-time critical GPS software modules from the third memory in the client device and to store in the second memory of the GPS receiver.

In another embodiment, there is a method in a GPS receiver that comprises the following steps: running a first set of instructions stored in a first memory in the GPS receiver when the GPS receiver is first provided power; downloading at least one time critical GPS software module to a second memory in the GPS receiver based on the first set of instructions stored in the first memory; running a second set of instructions stored in the first memory in the GPS receiver when the GPS receiver is first provided power; determining whether to download each of a plurality of non-time critical GPS software modules based on the second set of instructions stored in the first memory in the GPS receiver; and downloading each of the plurality of non-time critical GPS software modules to the second memory in the GPS receiver if it is determined that the non-time critical GPS software modules should be downloaded. The first set of instructions may access configuration data that provides information on which time critical GPS software modules and non-time critical GPS software modules should be downloaded to the second memory. Here, the GPS software modules may initially be stored in a memory of the client device prior to the steps of downloading the software modules.

Now, turning to the drawings, FIG. 1 illustrates a top-level block diagram of a global positioning system (GPS) for the present invention. Generally, the system may include a plurality of satellites 22 and a plurality of client devices 24A–C, each device containing an internal GPS receiver. The satellites 22 transmit radio signals to GPS receivers located inside the client devices 24A–C. The radio signals are pseudorandom signals that contain information modulated by a pseudo-random code. The GPS receivers are able to receive and process the satellite radio signals to calculate position and time. As shown in FIG. 1, the types of client devices may include, for example, a cellular telephone 24A, a vehicle navigation unit 24B, or a personal digital assistant (PDA) 24C. The type of client device, however, may be any electronic device that requires the use of a GPS receiver.

Figure 2A:
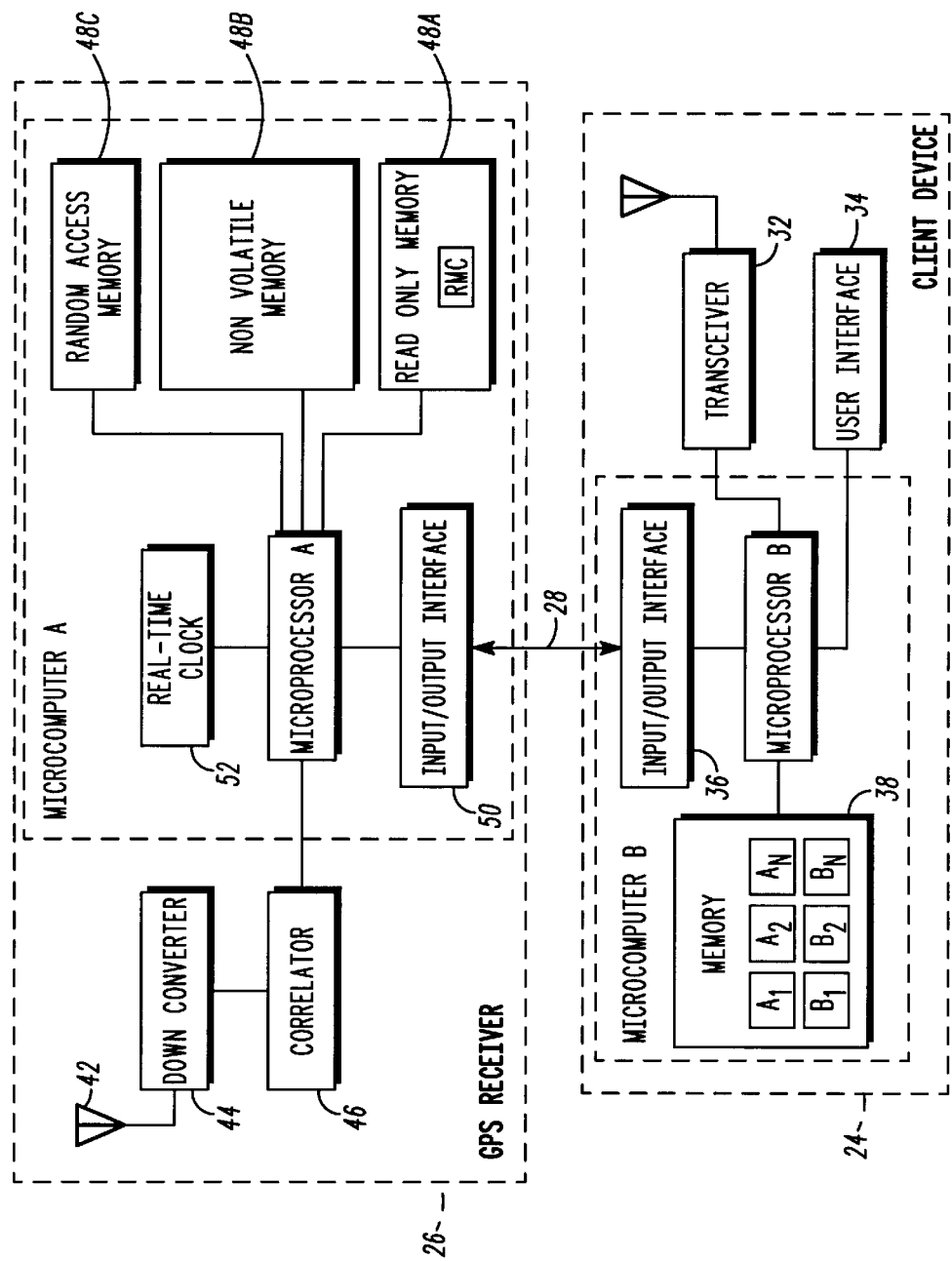
FIG. 2A is a block diagram of one embodiment of a GPS receiver connected to a client device before initial powering of the GPS receiver.

With reference to FIG. 2A, for example, a client device 24 in the form of a cellular telephone is shown although a similar architecture can be used for other types of electronic devices such as a vehicle navigation unit or a PDA. The client device 24 is connected to a GPS receiver 26 through communication link 28. The communication link 28 may be serial and/or parallel depending on the type of input/output interfaces used in the client device 24 and the GPS receiver 26. In one embodiment, the GPS receiver 26 is a module that can be physically installed within the client device 24. The GPS receiver 26 and client device 24 may transfer and receive data, software, and other information between each other via the communication link 28.

In one embodiment, the client device 24 has a microcomputer B, a cellular transceiver 32, and a user interface 34. The cellular transceiver 32 is used by the client device 24 to transmit and receive uplink and downlink wireless communications. The user interface 34 permits a user to interact with device specific applications. For example, if the client device 24 is in the form of a cellular telephone, the user interface 34 may include a keypad and a display screen for placing and receiving phone calls. In conjunction with the GPS receiver 26, the user interface 34 may be configured to provide navigation services to the user of the client device 24. Additionally, in one embodiment of the present invention, the user interface 34 may also include a mechanism to allow an OEM or other device operator to input data to configure the GPS receiver during initial powering of the GPS receiver 26. For example, the configuration data may include the type of GPS software functionality that should be stored within the client device 24 and the type of GPS software functionality that should be stored within the GPS receiver 26.

The microcomputer B within the client device 24 may include a microprocessor B, an input/output interface 36, and memory 38. The primary function of the microcomputer B is to operate the client device 24 according to device specific applications that are stored in the memory 38. In addition to device specific applications, the GPS manufacturer may provide the OEM of the client device 24 with certain GPS software components or other modules (such as modules $A_1$, $A_2$, ... $A_N$ and $B_1$, $B_2$, ... $B_N$) that are to be initially stored in the memory 38 of microcomputer B.

For instance, the GPS manufacturer may provide the OEM of the client device 24 with certain software modules that provide GPS functionality to the client device 24. These modules would be provided to the OEM for initial storage in the memory 38 of the client device 24. Some of these software modules may be time critical for GPS applications (such as modules $A_1$, $A_2$, ... $A_N$) and others may be non-time critical for GPS applications (such as modules $B_1$, $B_2$, ... $B_N$). In particular, certain applications for GPS functionality are time critical and must be handled by a microprocessor on a high-priority basis. Examples of time critical functions include searching, acquiring, or tracking satellites and generating initial measurement data from a GPS correlator. These types of functions require a microprocessor to respond to very quick interrupts (in the order of every millisecond).

Other types of applications for GPS functionality are non-time critical and do not need to be handled by the microprocessor in milliseconds. For example, some of the functions that take the initial measurement data and calculate a position solution usually do not need to be done every millisecond, but rather every second or possibly longer. Other types of non-time critical GPS software modules may be satellite visibility alerts and the computation of satellite orbits. Each type of GPS software module (time critical and non-time critical) is initially stored in the memory 38 of the client device 24. The present invention provides a distinct advantage to an OEM or other operator by providing the flexibility to choose how the GPS software is stored between the client device 24 and the GPS receiver 26.

In one embodiment, as shown in FIG. 2A, the GPS receiver 26 has a microcomputer A, an antenna 42, a down converter 44, and a correlator 46. As will be explained further below, when the GPS receiver 26 is downloaded with appropriate software, the GPS receiver 26 may be configured to receive, track, and decode data from a plurality of visible satellites to provide (via link 28) initial measurement data or, if the OEM or other operator chooses, further processed data such as position, velocity, and time data.

The antenna 42 is suitable for receiving the L-band signals broadcast by the GPS satellites. The antenna 42 is connected to the down converter 44. The down converter 44 provides signal-processing capability to convert the high frequency GPS satellites signals (L-band signals) to low frequency signals. The GPS receiver 26 may then use these low frequency signals to establish a location. Down converters for GPS receivers are well known and are commercially available. The output of the down converter 44 is connected to the correlator 46.

The correlator 44 may contain several components such as a signal processing means, at least one receiver channel, a PN generator, and a numeric controlled oscillator. The signal processing means within the correlator accepts input data from the down converter 44 and samples it at appropriate sample rates. At least one receiver channel is used to track the visible satellites of the GPS constellation. There may be, in one embodiment, a correlator 46 having a plurality of receiver channels, each to track one of the visible satellites of the GPS constellation. This is typically termed as continuous or parallel tracking. The correlator 46 may also contain a single receiver channel that is used on a time-multiplexed basis. In this embodiment, the correlator 46 requires time-sharing of the receiver channel among the plurality of visible satellites signals. This type of tracking is typically referred to as sequencing. The PN generator locally generates the PN code phases while the numeric controlled oscillator provides an output that is used to coherently adjust the PN code phases to account for Doppler. These and other functions of the correlator are well-known to those of ordinary skill in the art of GPS receivers.

In one embodiment, the microcomputer A may have a microprocessor A, a plurality of memories 48A–48C, an input/output interface 50, and a real time clock 52. In the embodiment shown in FIGS. 2A–2B, the plurality of memories 48A–48C include a first memory 48A, a second memory 48B, and a third memory 48C. Although three separate memories are shown in the figures, additional memories could be used or less than three memories may be used. The actual number of memories used will depend on the size and type of memory in the GPS receiver 26. As shown in FIG. 2A, in one embodiment, the first memory 48A may be a read only memory (ROM), the second memory 48B may be non-volatile memory, and the third memory 48C may be a random access memory (RAM). As explained below, the memories used here are for illustration purposes and different types of memories could be used without departing from the spirit of present invention.

Figure 2B:
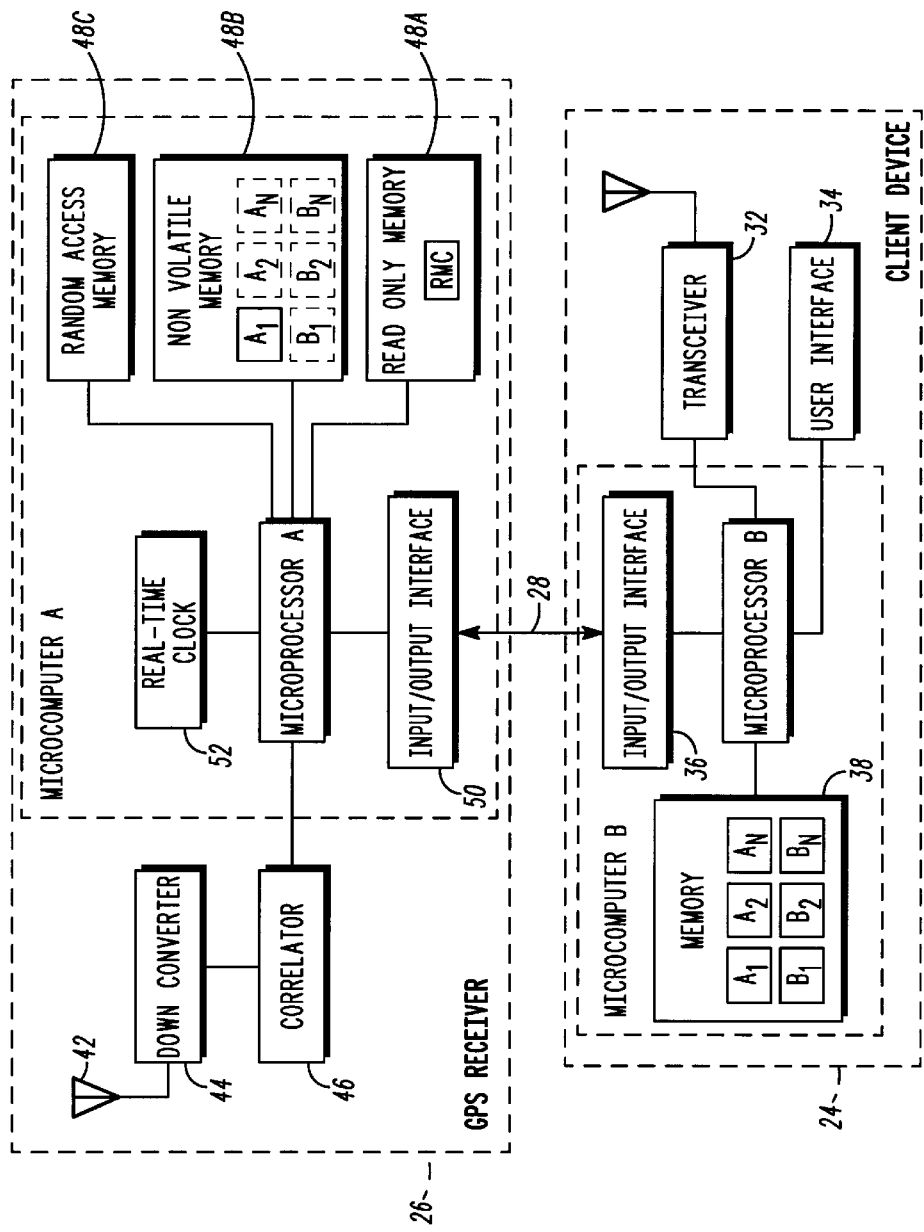
FIG. 2B is a block diagram of one embodiment of a GPS receiver connected to a client device after initial powering of the GPS receiver.

Referring to FIGS. 2A–2B, the first memory 48 may be used to store the startup code necessary to power-up the GPS receiver 26. A suitable type of memory for the first memory 48A is read only memory (ROM) although other types of memories could be used. The first memory 48 may further be used to store instructions for downloading GPS software modules from the client device 24 during the initial powering of the GPS receiver 26. For example, the first memory 48A may contain a first set of instructions for downloading time critical software modules ($A_1, A_2, \ldots A_N$) from the memory 38 of the client device 24, through the input/output interfaces 36 and 50, to the second memory 48B. This is further illustrated in FIG. 2B. In the preferred embodiment, all time critical GPS software modules ($A_1, A_2, \ldots A_N$), stored in the memory 38 of the client device 24, is downloaded and stored in the second memory 48B of the GPS receiver 26. This allows the microprocessor A in the GPS receiver 26 to process the quick interrupts needed for certain time critical GPS applications. The first set of instructions may further depend on configuration data stored in the client device 24 or GPS receiver 26 such as the third memory 48C. The configuration data would be accessible to the OEM or other operator of the client device 24. In one embodiment, the input or modification of configuration data could be through the user interface 34. Alternatively, the configuration data could be entered as a separate data file by the OEM or other operator and stored in memory of the client device 24 or GPS receiver 26.

The first memory 48A may further contain a second set of instructions for downloading non-time critical GPS software modules ($B_1, B_2, \ldots B_N$) from the memory 38 of the client device 24, through the input/output interfaces 36 and 50, to the second memory 48B. This is further illustrated in FIG. 2B. In one embodiment, the second set of instructions may depend on static and/or dynamic configuration data stored in the client device 24 or GPS receiver 26 such as the third memory 48C. The configuration data may include information identifying the type of non-time critical GPS software modules ($B_1, B_2, \ldots B_N$) that the OEM or other operator desires to be stored in the GPS receiver 26 (and run by microprocessor A), as opposed to being stored in the client device 24 (and run by microprocessor B). In one embodiment, the configuration data could be entered through the user interface 34 of the client device 24. Alternatively, the configuration data could be loaded through a data file provided by the OEM or operator and stored in memory.

There may be distinct reasons for the OEM or operator to have certain non-time critical GPS functions run by microprocessor A and other non-time critical GPS function run by microprocessor B. The present invention provides an advantage to the OEM or operator by allowing flexibility to configure and divide GPS functionality between the client device 24 and the GPS receiver 26. The power-up code and the first and second set of instructions may be collectively referred to as receiver minimal code (RMC), shown in FIGS. 2A–2B.

The second memory 48B, in one embodiment, is used to store any GPS software modules downloaded from the memory 38 of the client device 24, through the input/output interfaces 36 and 50. As shown in FIG. 2A, the client device 24 may initially contain time critical GPS software modules ($A_1, A_2, \ldots A_N$). The client device 24 may also initially contain non-time critical GPS software modules ($B_1, B_2, \ldots B_N$). As indicated above, it is preferred that all time critical GPS software modules ($A_1, A_2, \ldots A_N$) be downloaded and stored in the GPS receiver 26. Although, as explained below, the system can be configured to provide the OEM or other operator with a determination of which types of time critical GPS software modules ($A_1, A_2, \ldots A_N$) to be downloaded and stored in the GPS receiver 26. The present invention further provides the OEM or other operator with the determination of which types of non-time critical GPS software modules ($B_1$, $B_2$, ... $B_N$) to be downloaded and stored in the GPS receiver 26.

Figure 2C:
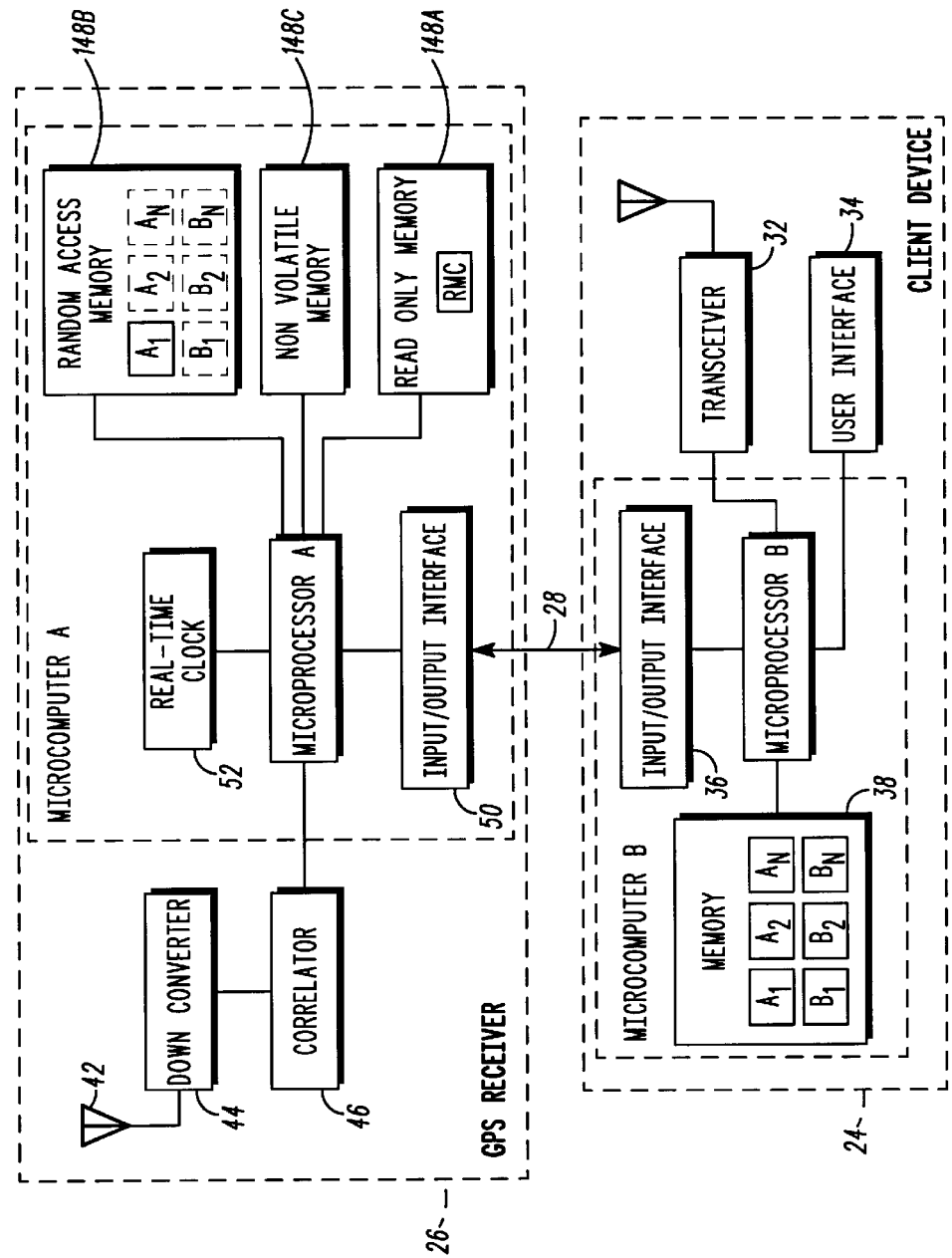
FIG. 2C is a block diagram of another embodiment of a GPS receiver connected to a client device after initial powering of the GPS receiver.

A suitable memory for the second memory 48B may be non-volatile memory although other types of memories may be used. For example, as illustrated in FIG. 2C, the GPS software modules may be downloaded and stored in a second memory 148B that is based in a battery-backed random access memory. In this case, the RMC is stored in a first memory 148A. This provides the microprocessor A with instructions for determining which types of GPS software modules to be downloaded from the client device 24 to the second memory 148B. One possible benefit of this embodiment is that the third memory 148C may be eliminated.

Referring back to FIGS. 2A–2B, the third memory 48C may be used to store any static and/or dynamic data needed by the first memory 48A to download GPS software modules from the client device 24 to the second memory 48B of the GPS receiver 26. For example, the third memory 48C may include an identification of which time critical GPS software modules ($A_1$, $A_2$, ... $A_N$) that may need to be downloaded from the client device 24 to the second memory 48B of the GPS receiver 26 (although it is preferred that all time critical GPS software modules be downloaded and stored in the GPS receiver 26). The third memory 48C may further include an identification of which non-time critical GPS software modules ($B_1$, $B_2$, ... $B_N$) that need to be downloaded from the client device 24 and stored in the second memory 48B of the GPS receiver 26. A suitable type of memory for the third memory 48B is random access memory, although other types of memories could be used.

The GPS receiver 26 may further include a real time clock 52 that provides time and data information to the microprocessor A. The real time clock 52 may be necessary for performing many functions of the GPS software modules. For example, the real time clock 52 may be used in a satellite tracking application for the selection of visible satellites. An almanac may be stored that details the orbits of each satellite based on the time of day.

The input/output interfaces 36 and 50 provides the input and output functions between the client device 24 and the GPS receiver 26 via communication link 28. A suitable type of interface is a universal asynchronous receiver/transmitter (UART). The use of a UART is preferred because it is typically less expensive than other types of input/output interfaces. However, the UART could be replaced with any type of input and output method known to those of ordinary skill in the art (including a dual-port RAM).

The present invention allows the OEM of a client device the flexibility to configure the type of software functionality that is stored and run on microcomputer A (in the GPS receiver 26) and on microcomputer B (in the client device 24). For example, in some types of client devices, the OEM may wish that only time critical GPS software modules ($A_1$, $A_2$, ... $A_N$) be stored in the GPS receiver 26 and run on microcomputer A. The remaining non-time critical GPS software modules ($B_1$, $B_2$, ... $B_N$) would be stored in the client device 24 and run on microcomputer B. This would result in raw measurement data to be sent over link 28 from the GPS receiver 26 to the client device 24.

In other types of client devices, the OEM may wish that (in addition to time critical GPS software modules) some non-time critical software modules be stored in microcomputer A. For example, if the OEM is in need of a faster position solution, it may be best for the OEM to choose to download the GPS software modules ($A_1$, $A_2$, ... $A_N$, $B_1$, $B_2$) relating to position solutions to the GPS receiver 26 so that they may also be run on microcomputer A. This would cause the data sent over communication link 28 to be further processed than if just the time critical GPS software was stored in the GPS receiver 26.

In other types of client devices, the OEM may wish that some time critical GPS software modules be stored in microcomputer A and the remaining time critical and non-time critical processing be performed by the microcomputer B. For example, if the OEM lacks the throughput to process all raw measurement data but desires to perform some real-time processing, it may be best for the OEM to choose to download some time critical GPS software modules ($A_1$, $A_2$) to the GPS receiver 26 and have the remaining GPS software modules ($A_N$, $B_1$, $B_2$, ... $B_N$) in the client device 24 so that they may be run on microcomputer B.

Given the microcomputer B in client device 24 can perform some real-time processing, the OEM may wish that some time critical and some non-time critical GPS software modules ($A_1$, $A_2$, $B_1$) be stored in the GPS receiver 26 so that they may be run on microcomputer A and the remaining time critical and non-time critical GPS software modules ($A_2$, ... $A_N$, $B_2$, ... $B_N$) be stored in the client device 24 so that they may be run on microcomputer B. This configuration would allow more mature GPS software modules to be allocated to one microcomputer while other, emerging GPS software modules are allocated to the other microcomputer.

Besides scalable, the GPS receiver 26 is also reconfigurable. For example, in other types of client devices, the OEM may wish that after time critical GPS software modules ($A_1$, $A_2$, ... $A_N$) are executed in GPS receiver 26, the time critical software modules are replaced with some non-time critical software modules ($B_1$, $B_2$, ... $B_N$) in GPS receiver 26. Note the client device 24 may choose to download the non-time critical software modules based on module size (for example, first $B_1$, then $B_2$, then $B_N$, etc.) or based on other criteria (for example, first $B_1$ and $B_2$ to compute a position solution, then downloading $B_N$ only if other processing is required like filtering the position solution). The exact choices of how the GPS software modules are implementation specific but the present invention allows the OEM or other operator to configure the system to their requirements or desires.

Figure 3:
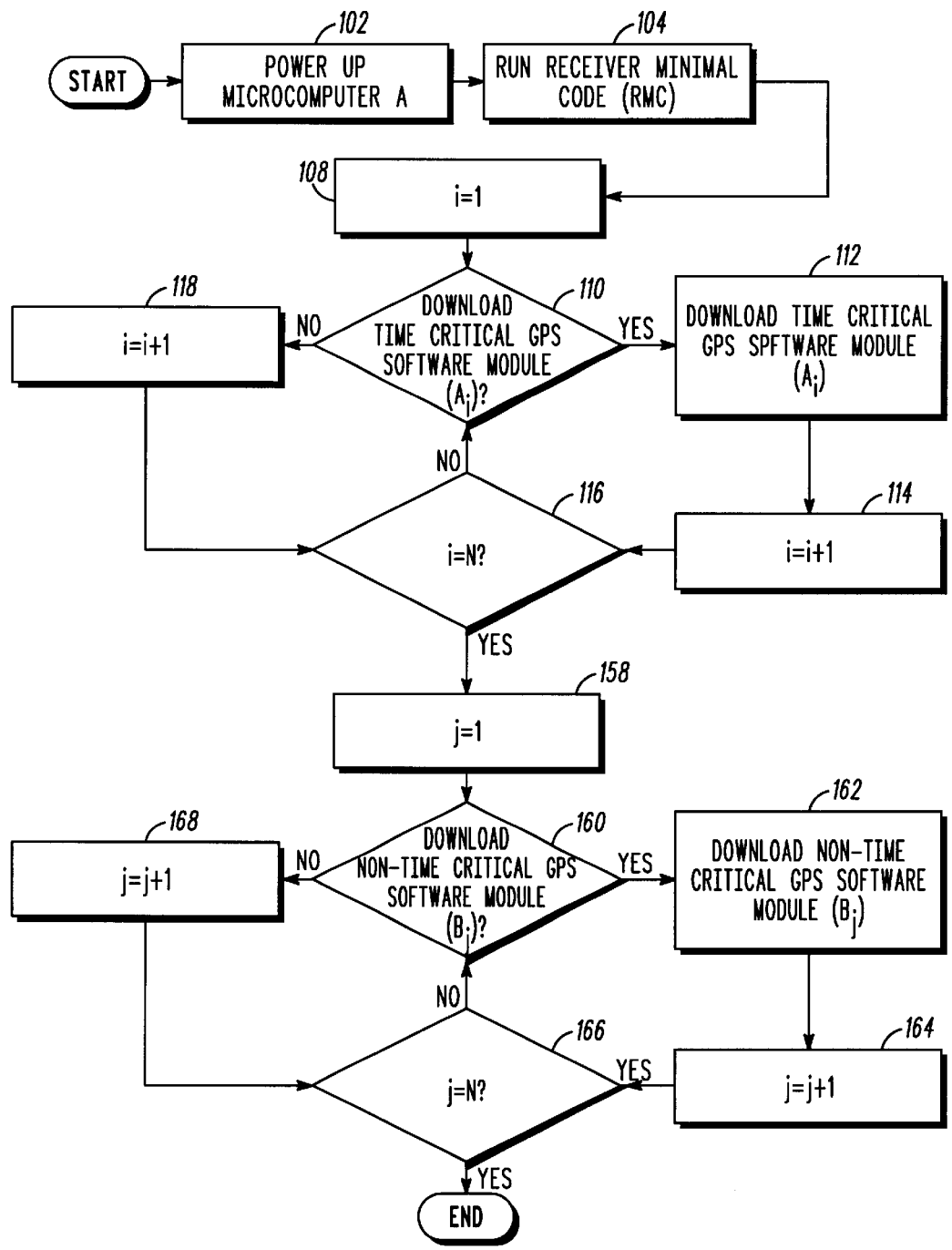
FIG. 3 illustrates one embodiment of a flow diagram for downloading GPS software modules from the client device to the GPS receiver.

FIG. 3 illustrates one embodiment of a method for operating the GPS receiver 26 during initial powering. The process starts at block 102 where the microcomputer A is initially powered up. The process then proceeds to block 104 where the microprocessor A within the microcomputer A runs the receiver minimal code (RMC). As explained above, the RMC contains the initial power-up code and the first and second set of instructions for downloading GPS software modules from the client device 24. The RMC, in one embodiment, is stored in a first memory 48A, 148A in the GPS receiver 26. The process may then initialize a counter (block 108, i=1) and proceed to decision block 110.

At decision block 110, in one embodiment, the GPS receiver 26 is configured to selectively decide which time critical GPS software modules to download from the client device 24 to the GPS receiver 26. There are a number of ways that the GPS receiver 26 makes this decision but it should be based on input from the manufacturer of the client device 24. In one embodiment, the process traverses through each type of time critical GPS software module to check whether the module should be downloaded and stored in the GPS receiver 26. The OEM or other operator may enter configuration data in one of the memories of the GPS receiver 26 that indicates whether any type of time critical GPS software module should be downloaded and stored in the GPS receiver 26. The process starts with the first type of time critical GPS software module (i=1) to determine whether it should be downloaded. If it should be downloaded, the process proceeds to block 112 where the first time critical GPS software module is downloaded and stored in the GPS receiver 26. The process then proceeds to block 114 where the counter is forwarded. At block 116, a determination is made whether all time critical GPS software modules have been checked for downloading (i=N). In one embodiment, the time critical GPS software modules ($A_1, A_2, \ldots A_N$) are accessed from memory 38 in the client device 24 and downloaded and stored to a second memory 48B, 148B in the GPS receiver 26.

Referring back to decision block 110, if the decision is not to download a particular software module, the process proceeds to block 118 where the counter is forwarded and then to block 116 where a determination is made whether all time critical GPS software modules have been checked for downloading (i=N). If all time critical GPS software modules have been checked for downloading then the process ends. Otherwise, if additional time critical GPS software modules need to be checked for downloading, the process proceeds back to decision block 110 where the process is repeated. Once complete, the process may then initialize a counter (block 158, j=1) and proceed to decision block 160.

At decision block 160, the GPS receiver 26 is configured to selectively decide which non-time critical GPS software modules to download from the client device 24 to the GPS receiver 26. There are a number of ways that the GPS receiver 26 makes this decision but it should be based on input from the manufacturer of the client device 24. In one embodiment, the process traverses through each type of non-critical GPS software module to check whether the module should be downloaded and stored in the GPS receiver 26. The OEM or other operator may enter configuration data in one of the memories of the GPS receiver 26 that indicates whether any type of non-critical GPS software module should be downloaded and stored in the GPS receiver 26. The process starts with the first type of non-time critical GPS software module (j=1) to determine whether it should be downloaded. If it should be downloaded, the process proceeds to block 162 where the first non-time critical GPS software module is downloaded and stored in the GPS receiver 26. The process then proceeds to block 164 where the counter is forwarded. At block 166, a determination is made whether all non-time critical GPS software modules have been checked for downloading (j=N).

Referring back to decision block 160, if the decision is not to download a particular software module, the process proceeds to block 168 where the counter is forwarded and then to block 166 where a determination is made whether all non-time critical GPS software modules have been checked for downloading O=N). If all non-time critical GPS software modules have been checked for downloading then the process ends. Otherwise, if additional non-time critical GPS software modules need to be checked for downloading, the process proceeds back to decision block 160 where the process is repeated.

The process in FIG. 3 is one way of determining whether certain GPS software modules should be downloaded. Alternatively, a decision block may be removed for time-critical GPS software modules since it is preferred that all time-critical GPS software modules be downloaded from the client device 24 to the GPS receiver 26. Additionally, instead of sequentially traversing through each non-time critical GPS software module to determine whether it should be downloaded, the process may be a single process block that identifies an address to a specific non-time critical GPS software modules (if any) that should be downloaded.

What has been described is a system and method for a GPS receiver adapted for installation into client devices that is configurable to different client devices having varying limitations and functions. The above description of the present invention is intended to be exemplary only and is not intended to limit the scope of any patent issuing from this application. The present invention is intended to be limited only by the scope and spirit of the following claims.

What is claimed is:

1. A receiver for processing satellite signals and adapted for connection to a client device, the receiver comprising:

a down converter;

a correlator; and a microcomputer having a microprocessor, a first memory, a second memory, and an input/output interface, the input/output interface capable of being connected to the client device;

wherein the first memory contains a first set of instructions for the microprocessor to download and store in the second memory at least one time critical software module from the client device, through the input/output interface, the first memory further containing a second set of instructions for the microprocessor to determine whether to download and store in the second memory a plurality of non-time critical software modules from the client device, through the input/output interface.

2. The receiver in claim 1 further containing a third memory, the third memory containing configuration data accessible to the first set of instructions and the second set of instructions.

3. The receiver in claim 2 wherein the configuration data contained in the third memory includes an identification of the type of time critical software modules that is to be downloaded from the client device to the second memory.

4. The receiver in claim 2 wherein the configuration data contained in the third memory includes an identification of the type of non-time critical software modules that is to be downloaded from the client device to the second memory.

5. The receiver in claim 1 wherein the satellite signals are generated from a plurality of global positioning system (GPS) satellites and the at least one time critical software module includes the function of searching, acquiring, or tracking the GPS satellites.

6. The receiver in claim 5 wherein the at least one of the plurality of non-time critical software modules includes the function of determining a position solution.

7. The receiver in claim 5 wherein the input/output interface is a universal asynchronous receiver/transmitter.

8. An apparatus comprising:

a GPS receiver having a first microprocessor, a first memory, a second memory, and an input/output interface; and a client device having a second microprocessor, a third memory, and an input/output interface; the input/output interface of the client device connected to the input/output interface of the GPS receiver via a communication link;

wherein the first memory of the GPS receiver contains a first set of instructions for the first microprocessor to download at least one time critical GPS software module from the third memory in the client device and to store in the second memory of the GPS receiver, wherein the first memory of the GPS receiver further contains a second set of instructions for the microprocessor to determine whether to download each of a plurality of non-time critical GPS software modules from the third memory in the client device and to store in the second memory of the GPS receiver.

9. The apparatus in claim 8 wherein the GPS receiver has configuration data accessible to the first set of instructions and the second set of instructions.

10. The apparatus in claim 9 wherein the configuration data contained in the GPS receiver includes an identification of the type of time critical GPS software modules that is to be downloaded from the third memory in the client device to the second memory of the GPS receiver.

11. The apparatus in claim 9 wherein the configuration data contained in the GPS receiver includes an identification of the type of non-time critical GPS software modules that is to be downloaded from the third memory in the client device to the second memory of the GPS receiver.

12. The apparatus in claim 8 wherein the at least one time critical GPS software module includes the function of searching, acquiring, or tracking a plurality of GPS satellites.

13. The apparatus in claim 8 wherein at least one of the plurality of non-time critical software modules includes the function of determining a position solution.

14. The apparatus in claim 8 wherein the input/output interface in the GPS receiver and the input/output interface of the client device are universal asynchronous receivers/transmitters.

15. A method in a global positioning system (GPS) receiver, the method comprising the steps of:

running a first set of instructions stored in a first memory in the GPS receiver when the GPS receiver is first provided power;

downloading at least one time critical GPS software module to a second memory in the GPS receiver based on the first set of instructions stored in the first memory;

running a second set of instructions stored in the first memory in the GPS receiver when the GPS receiver is first provided power;

determining whether to download each of a plurality of non-time critical GPS software modules based on the second set of instructions stored in the first memory in the GPS receiver; and downloading each of the plurality of non-time critical GPS software modules to the second memory in the GPS receiver if it is determined that the non-time critical GPS software module should be downloaded.

16. The method in claim 15, wherein the first set of instructions access configuration data that provides information on which time critical GPS software modules should be downloaded to the second memory.

17. The method in claim 15, wherein the at least one time critical GPS software module includes the function of searching, acquiring, or tracking a plurality of GPS satellites.

18. The method in claim 15, wherein the second set of instructions access configuration data that provides information on which non-time critical GPS software modules should be downloaded to the second memory.

19. The method in claim 15, wherein at least one of the plurality of non-time critical GPS software modules includes the function of determining a position solution.

20. The method in claim 15, wherein the time critical GPS software modules and non-time critical GPS software modules are initially stored in a memory of a client device prior to the steps of downloading the GPS software modules to the second memory.

* * * * *